(12) United States Patent
Oh

(10) Patent No.: US 11,265,065 B2
(45) Date of Patent: Mar. 1, 2022

(54) SYSTEM AND METHOD FOR MIMO WIRELESS COMMUNICATION FOR A MOTOR VEHICLE

(71) Applicant: GM Global Technology Operations LLC, Detroit, MI (US)

(72) Inventor: Jang Hwan Oh, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 187 days.

(21) Appl. No.: 16/543,034

(22) Filed: Aug. 16, 2019

(65) Prior Publication Data

US 2021/0050905 A1 Feb. 18, 2021

(51) Int. Cl.
| | |
|---|---|
| H04B 7/08 | (2006.01) |
| H04B 7/0413 | (2017.01) |
| H01Q 1/32 | (2006.01) |
| H04B 17/336 | (2015.01) |
| H04B 17/318 | (2015.01) |

(52) U.S. Cl.
CPC ......... *H04B 7/0834* (2013.01); *H01Q 1/3275* (2013.01); *H01Q 1/3291* (2013.01); *H04B 7/0413* (2013.01); *H04B 17/318* (2015.01); *H04B 17/336* (2015.01)

(58) Field of Classification Search
CPC .. H04B 7/0834; H04B 7/0413; H04B 17/318; H04B 17/336; H01Q 1/3275; H01Q 1/3291

See application file for complete search history.

(56) References Cited

U.S. PATENT DOCUMENTS

| | | | | |
|---|---|---|---|---|
| 7,742,874 | B1* | 6/2010 | Mayfield | G08B 13/1436 701/517 |
| 2013/0237294 | A1* | 9/2013 | Periyalwar | H04B 7/0825 455/575.7 |
| 2016/0150445 | A1* | 5/2016 | Sandhu | H04W 36/0094 370/331 |
| 2018/0041626 | A1* | 2/2018 | Dods | H04M 11/00 |
| 2019/0027834 | A1* | 1/2019 | Givati | H01Q 21/0025 |
| 2020/0037128 | A1* | 1/2020 | Lu | H04W 72/12 |
| 2020/0266850 | A1* | 8/2020 | Eaton | H04W 48/20 |

* cited by examiner

*Primary Examiner* — Jeffrey M Rutkowski
*Assistant Examiner* — Jasper Kwoh
(74) *Attorney, Agent, or Firm* — Vivacqua Crane PLLC

(57) ABSTRACT

A MIMO system is provided for a vehicle having an exterior structure and an enclosure. The system includes external antennas attached to the exterior structure and internal antennas positioned within the enclosure. The system further includes an RF transceiver and an antenna selecting device. The selecting device is disposable between a first state where the selecting device is configured to operably connect at least two of the external antennas to the RF transceiver and a second state where the selecting device is configured to operably connect one or more of the external antennas and one or more of the internal antennas to the RF transceiver. A controller is configured to actuate the selecting device to move to the second state, in response to the signal strength being above an upper strength threshold, and in further response to the ratio being above an upper ratio threshold.

6 Claims, 2 Drawing Sheets

SYSTEM AND METHOD FOR MIMO WIRELESS COMMUNICATION FOR A MOTOR VEHICLE

INTRODUCTION

The present disclosure relates to Multiple-Input, Multiple-Output (MIMO) wireless communication, and more particularly, to a MIMO system and method for selecting antennas to increase data throughput and antenna efficiency for a vehicle communication system of a motor vehicle.

Modern vehicles have "shark-fin" antenna modules that contain a number of antennas and are mounted to the vehicle roof. Examples of these antennas include a dedicated short-range communications (DSRC) antenna, AM/FM radio antennas, a satellite radio antenna, a GPS antenna, and two or more MIMO antennas that provide 4G LTE cellular communications. The location of the module on the vehicle roof can increase antenna efficiency when, for example, the signal is weak and the vehicle is located in a rich scattering environment. However, the performance of the MIMO antenna can degrade if the vehicle is located in a "less path" or "line of sight" environment. Furthermore, for MIMO applications, spatial correlation is one of the key factors that influences system performance. Because system performance deteriorates if antenna spacing between the two MIMO antennas is insufficient, the size of the module must be increased, relative to previous antenna modules that do not have MIMO antennas.

Thus, while current MIMO systems achieve their intended purpose, there is a need for a new and improved MIMO system and method that addresses these issues.

SUMMARY

According to several aspects of the present disclosure, a Multiple-Input, Multiple-Output (MIMO) system for a motor vehicle having an exterior structure and an enclosure is provided. The system includes a plurality of external antennas adapted to be attached to the exterior structure. The system further includes a plurality of internal antennas adapted to be positioned within the enclosure. The system further includes an RF transceiver and an antenna selecting device. The antenna selecting device is disposable between a first state where the antenna selecting device is configured to operably connect two or more of the external antennas to the RF transceiver and a second state where the antenna selecting device is configured to operably connect one or more of the external antennas and one or more of the internal antennas to the RF transceiver. The system further includes a controller configured to determine a signal strength and a signal-to-noise ratio. In addition, the controller is also configured to actuate the antenna selecting device to move to the second state, in response to the controller determining that the signal strength is above an upper signal strength threshold, and in further response to the controller determining that the signal-to-noise ratio is above an upper signal-to-noise ratio threshold.

In one aspect, the RF transceiver is operably disconnected from each of the internal antennas such that the RF transceiver does not receive the signals from the internal antennas, in response to the antenna selecting device being disposed in the first state.

In another aspect, the controller is configured to actuate the antenna selecting device to move to the first state, in response to the controller determining that the signal strength is below a lower signal strength threshold, with the lower signal strength threshold being below the upper signal strength threshold.

In another aspect, the controller is configured to actuate the antenna selecting device to move to the first state, in response to the controller determining that the signal-to-noise ratio is below a lower signal-to-noise ratio threshold, with the lower signal-to-noise ratio threshold being below the upper signal-to-noise ratio threshold.

In another aspect, the plurality of external antennas includes two external antennas.

In another aspect, the plurality of internal antennas includes two internal antennas.

In another aspect, the signal strength is Reference Signal Received Power (RSRP).

In another aspect, the signal to noise ratio is a Signal-To-Interference Plus Noise Ratio (SINR).

According to several aspects of the present disclosure, a Multiple-Input, Multiple-Output (MIMO) system is provided for a motor vehicle having an exterior structure and an enclosure. The system includes a plurality of external antennas adapted to be attached to the exterior structure. The system further includes a plurality of internal antennas adapted to be positioned within the enclosure. The system further includes an RF transceiver and an antenna selecting device. The antenna selecting device is disposable between a first state where the selecting device is configured to operably connect two or more of the external antennas to the RF transceiver and a second state where the antenna selecting device is configured to operably connect one or more of the external antennas and one or more of the internal antennas to the RF transceiver. The selecting device includes a plurality of switches. Each switch is disposable between a first position for operably connecting one of the external antennas to the RF transceiver and a second position for operably connecting one of the internal antennas to the RF transceiver. The system further includes a controller configured to determine a signal strength and a signal-to-noise ratio. In addition, the controller is also configured to actuate the selecting device to move to the second state, in response to the controller determining that the signal strength is above an upper signal strength threshold, and the controller determining that the signal-to-noise ratio is above an upper signal-to-noise ratio threshold.

In one aspect, the plurality of external antennas includes two external antennas.

In another aspect, the plurality of internal antennas includes two internal antennas.

In another aspect, the plurality of switches includes two switches.

In another aspect, the controller is configured to move one of the two switches to the first position and the other of the two switches to the second position, in response to the controller determining that the signal strength is above an upper signal strength threshold, and in further response to the controller determining that the signal-to-noise ratio is above an upper signal-to-noise ratio threshold.

In another aspect, the controller is configured to move each of the switches to the first position, in response to the controller determining that the signal strength is below a lower signal strength threshold, or the signal-to-noise ratio is below a lower signal-to-noise ratio threshold.

In another aspect, the switch is at least one of an electromechanical switch, a PIN diode, an analog RF switch, and a MEMS-based switch.

According to several aspects of the present disclosure, a method of operating a Multiple-Input, Multiple-Output (MIMO) system is provided. The MIMO system includes a plurality of external antennas, a plurality of internal antennas, an antenna selecting device, an RF transceiver, and a controller, with the antenna selecting device having a plurality of switches. The method includes the steps of the controller determining a signal strength and a signal-to-noise ratio. The controller compares the signal strength to a signal strength threshold, and the controller compares the signal-to-noise ratio to a signal-to-noise ratio threshold. The method further includes the antenna selecting device operably connecting one or more of the external antennas and one or more of the internal antennas to the RF transceiver, in response to the controller determining that the signal strength is above an upper signal strength threshold and in further response to the controller determining that the signal-to-noise ratio is above an upper signal-to-noise threshold.

In one aspect, the method further includes the antenna selecting device operably connecting two or more of the external antennas to the RF transceiver, in response to the controller determining that the signal strength is below a lower signal strength threshold, with the lower signal strength threshold being below the upper signal strength threshold.

In another aspect, the method further includes the antenna selecting device operably connecting two or more of the external antennas to the RF transceiver, in response to the controller determining that the signal-to-noise strength is below a lower signal-to-noise strength threshold, with the lower signal-to-noise strength threshold being below the upper signal-to-noise strength threshold.

In another aspect, the method further includes operably disconnecting the RF transceiver from each of the internal antennas, in response to the antenna selecting device being disposed in the first state, such that the RF transceiver does not receive the signals from the internal antennas.

In another aspect, the method further includes moving one of the switches to the first position and the other of the switches to the second position, in response to the controller determining that the signal strength is above an upper signal strength threshold, and in further response to the controller determining that the signal-to-noise ratio is above an upper signal-to-noise ratio threshold.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
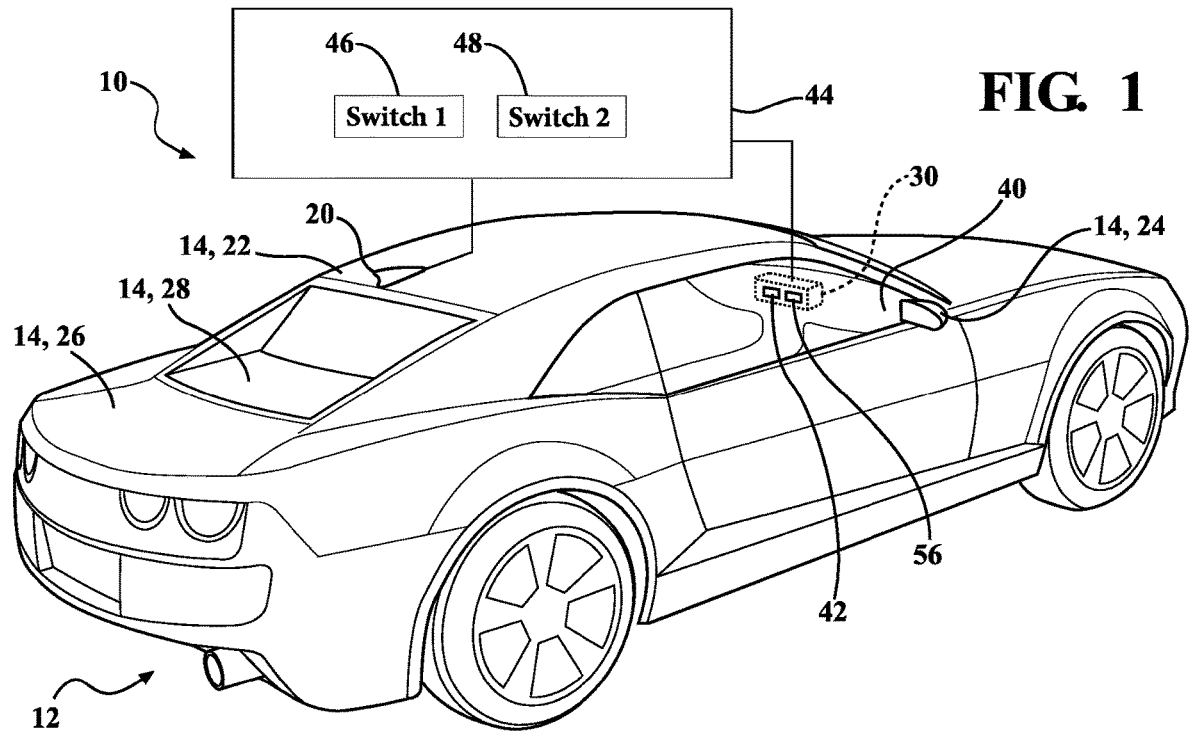
FIG. 1 is a perspective view of vehicle having one embodiment of a MIMO system.
Figure 2:
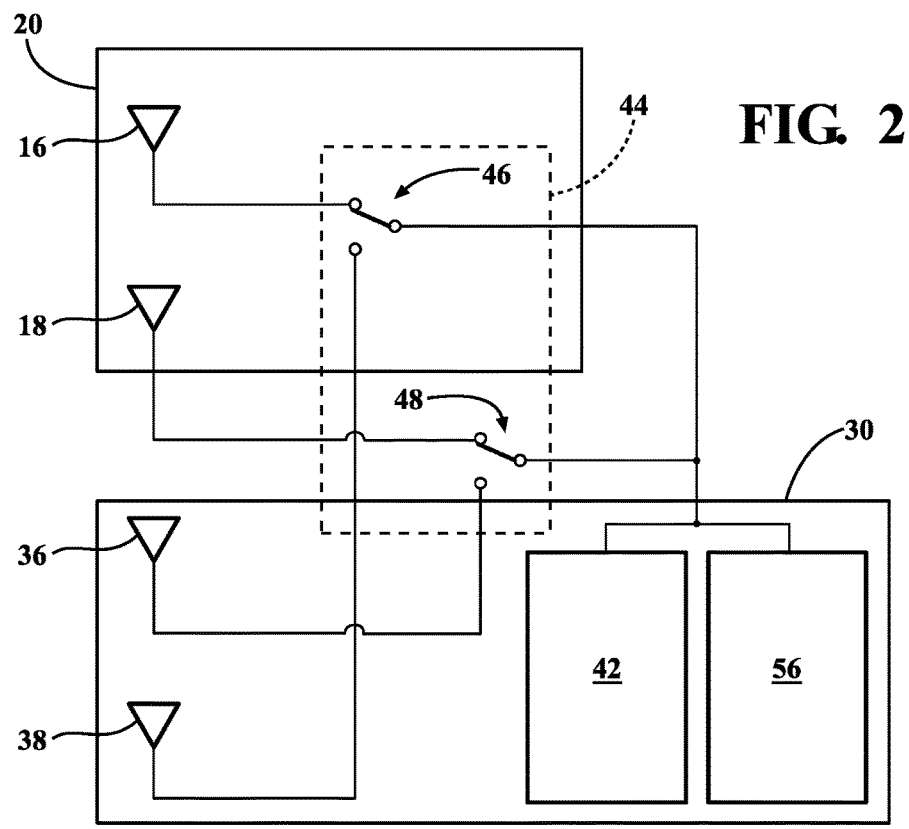
FIG. 2 is a schematic view of vehicle the MIMO system of FIG. 1.

Referring to FIGS. 1 and 2, there is generally illustrated a Multiple-Input, Multiple-Output (MIMO) system 10 for a motor vehicle 12 having an exterior structure 14. The MIMO system 10 includes a plurality of external antennas 16, 18 (FIG. 2) attached to a portion of the exterior structure 14 to improve the proportion of a radio wave's power intercepted by the antennas 16, 18. More specifically, in this example, the MIMO system 10 includes a shark-fin antenna module 20, which contains the external antennas 16, 18 and is attached to a rear portion of the vehicle roof 22. However, it is contemplated that the external antennas 16, 18 can be attached to any suitable exterior structure. Non-limiting examples of the exterior structure may include a sideview mirror 24, a trunk 26, or a rear shelf 28.

Referring to FIG. 2, the external antennas include a primary antenna 16 that is used for uplink data transmission and downlink data transmission and a secondary antenna 18 that is used for downlink data transmission. These antennas 16, 18 are used for 4G cellular applications as will be described in detail below.

The antenna module 20 may further include non-MIMO antenna elements (not shown) for applications, such as a DSRC antenna, AM/FM radio antennas, a satellite radio antenna, and a GPS antenna. It is noted that the desired propagation channel requirements for antennas 16, 18 is opposite to that for non-MIMO cellular services in that the antenna-based cellular services require antennas 16, 18 multipath signal channels as opposed to non-MIMO supported cellular services.

The vehicle 12 further includes an enclosure 30, and the MIMO system 10 further includes a plurality of internal antennas 36, 38 that are positioned within the enclosure 30 to provide a multipath signal propagation environment as a result of signal reflections off of metallic structures within the vehicle. In this example, the enclosure 30 is a telematics module that contains the internal antennas 36, 38, and this module is contained within an instrument panel 40 that is in turn surrounded by climate control systems, entertainment systems, and various components of the powertrain, chassis, and body.

The internal antennas include a primary antenna 36 that is used for uplink data transmission and downlink data transmission and a secondary antenna 38 that is used for downlink data transmission. These antennas 36, 38 are used for 4G cellular applications as will be described in detail below.

As the signals are reflected from various structures between the transmitter (not shown) and the RF transceiver 42 and as they constructively and destructively interfere with each other, the correlation between the signals received by the multiple antennas increases or decreases. If any of the internal antennas are spaced farther apart from one another with some diminishing return, then the signals become more uncorrelated so as to increase MIMO performance. Furthermore, combinations of only the internal antennas 36, 38 within the enclosure 30 may provide better MIMO performance than combinations of only external antennas or combinations of external and internal antennas because multipath signals are facilitated by the local scatter inherently present inside the vehicle 12. Accordingly, the internal antennas 36, 38 within the enclosure 30 can be spaced closer together than the external antennas 16, 18 on the roof 22 and still provide the same data throughput. However, it is contemplated that the internal antennas can be spaced farther apart from one another than the external antennas are spaced from one another.

One or more of the external antennas 16, 18 can be used in combination with one or more of the internal antennas 36, 38 for 4G cellular applications to provide signals that are less correlated and to increase data throughput. More specifically, each of the external antennas 16, 18 may be spaced from the internal antennas 36, 38 by a distance that is greater than any of the distances between the external antennas and any of the distances between the internal antennas, such that signals received by a combination of external and internal antennas are more uncorrelated than signals received by combinations of only external antennas or combinations of only internal antennas. In one example, the primary antenna 16 that is attached to the exterior structure 14 can be used in combination with the secondary antenna 38 disposed within the enclosure 30 for 4G cellular applications. In another example, the primary antenna 36 disposed within the enclosure 30 can be used in combination with the secondary antenna 18 that is attached to the exterior structure 14 for 4G cellular applications.

The MIMO system 10 further includes an RF transceiver 42 for the operation of any or all of the communications systems associated with the antennas 16, 18. As would be well understood by those skilled in the art, each of the antennas 16, 18 electrically communicates with the RF transceiver 42.

The MIMO system 10 further includes an antenna selecting device 44 movable to a first state where the antenna selecting device 44 is configured to operably connect at least two of the external antennas 16, 18 to the RF transceiver 42 to communicate with the RF transceiver 42. In addition, in response to the antenna selecting device 44 being disposed in the first state, the RF transceiver 42 is operably disconnected from each of the internal antennas 36, 38 such that the RF transceiver 42 does not receive the signals from the internal antennas 36, 38. Furthermore, the antenna selecting device is also movable to a second state where the antenna selecting device 44 is configured to operably connect one or more of the external antennas 16, 18 and one or more of the internal antennas 36, 38 to the RF transceiver 42 to communicate with the RF transceiver 42.

In this example, the antenna selecting device 44 includes a plurality of switches 46, 48 and each of the switches is movable between a first position for operably connecting the RF transceiver 42 to one of the external antennas and a second position for operably connecting the RF transceiver 42 to one of the internal antennas. More specifically, in this example, the plurality of switches also includes first and second switches 46, 48. The first switch 46 is movable between a first position for operably connecting the RF transceiver 42 to the external antenna 16 and a second position for operably connecting the RF transceiver 42 to the internal antenna 36. The second switch 48 is movable between a first position for operably connecting the RF transceiver 42 to the external antenna 18 and a second position for operably connecting the RF transceiver 42 to the internal antenna 38. Other examples of the antenna selecting device can include more or fewer than two switches for selecting any combination of antennas for electrically communicating with the RF transceiver 42 for 4G cellular applications. In other examples, the antenna selecting device 44 (FIG. 1) can include switches in the form of a PIN diode, an analog RF switch, a MEMS-based switch, or any combination thereof.

The MIMO system 10 further includes a controller 56 configured to determine a signal strength and a signal-to-noise ratio. The controller 56 is configured to compare the signal strength and the signal-to-noise ratio to associated thresholds for actuating the antenna selecting device 44 to select various combinations of antennas to communicate with the RF transceiver 42. In this example, the controller 56 is disposed within the telematics module 30. In addition, the signal strength is Reference Signal Received Power (RSRP), and the signal-to-noise ratio is a Signal-To-Interference Plus Noise Ratio (SINR). It is contemplated that the controller can measure other parameters, perform other calculations, and apply other suitable criteria for operating the antenna selecting device.

In response to the controller 56 determining that the signal strength is above an upper signal strength threshold and in further response to the controller determining that the signal-to-noise ratio is above an upper signal-to-noise ratio threshold, the controller 56 actuates the antenna selecting device 44 to move to the second state. Continuing with the previous example, the controller 56 is configured to move one of the switches 46, 48 to the first position and the other of the switches 46, 48 to the second position. More specifically, the controller 56 is configured to move the switch 46 to the first position such that the primary antenna 16 that is attached to the exterior structure 14 communicates with the RF transceiver 42, and the controller 56 is configured to move the other switch 48 to the second position such that the secondary switch 48 that is disposed within the enclosure 30 communicates with the RF transceiver 42. In addition, the controller 56 is further configured to move the switch 46 to the second position such that the primary antenna 36 that is disposed within the enclosure 30 communicates with the RF transceiver 42, and the switch 48 moves to the first position such that the secondary antenna 18 that is attached to the exterior structure 14 communicates with the RF transceiver 42.

Furthermore, the controller 56 is configured to actuate the antenna selecting device 44 to move to the first state, in response to the controller 56 determining that the signal strength is below a lower signal strength threshold, which is below the upper signal strength threshold. In addition, the controller 56 is configured to actuate the antenna selecting device 44 to move to the first state, in response to the controller determining that the signal-to-noise ratio is below a lower signal-to-noise ratio threshold that is below the upper signal-to-noise ratio threshold. More specifically, the controller 56 is configured to move each of the switches to the first position, in response to the controller determining that the signal strength is below a lower signal strength threshold, or the controller determining that the signal-to-noise ratio is below a lower signal-to-noise ratio threshold.

Figure 3:
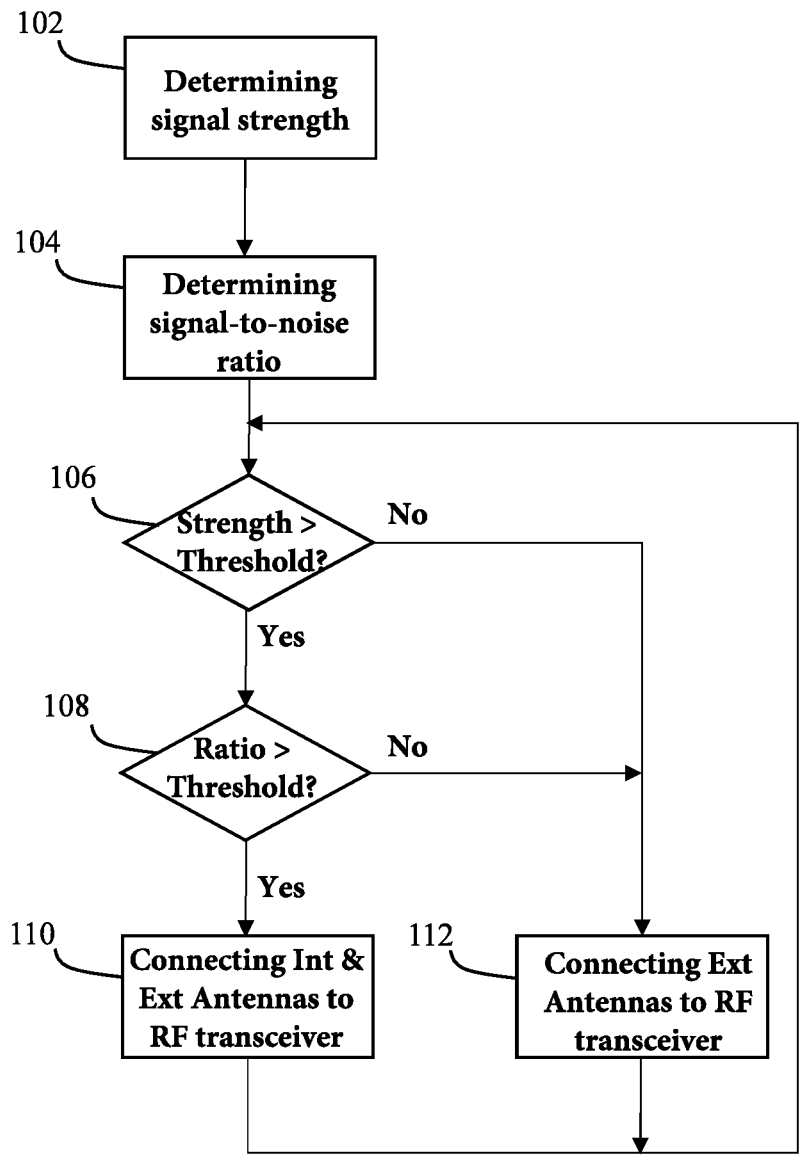
FIG. 3 is a flow chart of a method of using the MIMO system of FIG. 2.

Referring to FIG. 3, a flowchart for a method 100 of operating the MIMO system 10 of FIGS. 1 and 2 is illustrated. At step 102, the method begins with the controller 56 determining a signal strength.

At step 104, the controller 56 determines a signal-to-noise ratio. It is contemplated that the controller can measure other parameters, perform other calculations, and apply other suitable criteria for operating the MIMO system 10.

At step 106, the controller 56 compares the signal strength to a signal strength threshold. If the controller 56 determines that the signal strength is below the signal strength threshold, the method proceeds immediately to step 112. If the controller 56 determines that the signal strength is above the signal strength threshold, the method proceeds to step 108.

At step 108, the controller 56 compares the signal-to-noise ratio to a signal-to-noise ratio threshold. If the controller 56 determines that the signal strength is below the signal-to-noise ratio threshold, the method proceeds immediately to step 112. If the controller 56 determines that the signal-to-noise ratio is above the signal-to-noise ratio threshold, the method proceeds to step 110.

At step 110, the antenna selecting device 44 operably connects one or more of the external antennas 16, 18 and one or more of the internal antennas 36, 38 to the RF transceiver 42. In this way, the antenna selecting device 44 operably connects antennas to the RF transceiver 42, such that the antennas are decorrelated from one another and the internal antennas receive multipath signals provided by at least the local scatter present within the vehicle 12. Continuing with the previous example, the switch 46 moves to the first position to operably connect the primary antenna 16 to the RF transceiver 42, and the switch 48 moves to the second position to operably connect the secondary antenna 38 to the RF transceiver 42. In another example, the switch 46 moves to the second position to operably connect the primary antenna 36 to the RF transceiver 42, and the switch 48 moves to the first position to operably connect the secondary antenna 18 to the RF transceiver 42. Both antennas 36, 38 are positioned within the enclosure 30 and receive multipath signals provided by at least the local scatter associated with the enclosure 30 and surrounding vehicle. The method returns to step 106.

At step 112, the antenna selecting device 44 operably connects two or more of the external antennas 16, 18 to the RF transceiver 42. Also, in response to the antenna selecting device being disposed in the first state, the RF transceiver 42 is operably disconnected from each of the internal antennas 36, 38, such that the RF transceiver 42 does not receive the signals from any of the internal antennas 36, 38.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A MIMO system for a motor vehicle having an exterior structure and an enclosure, the MIMO system comprising:
    a plurality of external antennas adapted to be attached to the exterior structure;
    a plurality of internal antennas adapted to be positioned within the enclosure;
    an RF transceiver;
    an antenna selecting device disposable between a first state where the antenna selecting device is configured to operably connect at least two of the external antennas to the RF transceiver for wired communication therebetween and a second state where the antenna selecting device is configured to operably connect at least one of the external antennas and at least one of the internal antennas to the RF transceiver for wired communication therebetween, wherein the antenna selecting device comprises a plurality of switches, and each of the switches is movable between a first position for operably connecting the RF transceiver to one of the external antennas and a second position for operably connecting the RF transceiver to one of the internal antennas; and
    a controller configured to:
        determine a signal strength and a signal-to-noise ratio;
        actuate the antenna selecting device to move to the first state, in response to the controller determining that the signal strength is below a lower signal strength threshold, with the lower signal strength threshold being below an upper signal strength threshold; and
        actuate the antenna selecting device to move to the second state, in response to the controller determining that the signal strength is above the upper signal strength threshold, and in further response to the controller determining that the signal-to-noise ratio is above an upper signal-to-noise ratio threshold;
        wherein the controller is configured to move each of the switches to the first position, in response to at least one of the controller determining that the signal strength is below the lower signal strength threshold, and the controller determining that the signal-to-noise ratio is below a lower signal-to-noise ratio threshold.

2. The MIMO system of claim 1 wherein the plurality of external antennas comprises two external antennas.

3. The MIMO system of claim 2 wherein the plurality of internal antennas comprises two internal antennas.

4. The MIMO system of claim 3 wherein the plurality of switches comprises two switches.

5. The MIMO system of claim 4 wherein the controller is configured to move one of the switches to the first position and the other of the switches to the second position, in response to the controller determining that the signal strength is above the upper signal strength threshold, and in further response to the controller determining that the signal-to-noise ratio is above the upper signal-to-noise ratio threshold.

6. The MIMO system of claim 1 wherein each of the switches is at least one of an electromechanical switch, a PIN diode, an analog RF switch, and a MEMS-based switch.

* * * * *